United States Patent
Krueger et al.

[11] 3,898,029
[45] Aug. 5, 1975

[54] METHOD AND APPARATUS FOR FORMING AND KEEPING MOLTEN THE RECESSED AREA OF A FABRICATED PLASTIC PRODUCT

[75] Inventors: David F. Krueger, Minneapolis; Edmond S. Kaliszewski, St. Paul, both of Minn.

[73] Assignee: Standard Oil Company (Ind.), Chicago, Ill.

[22] Filed: Sept. 17, 1973

[21] Appl. No.: 397,827

Related U.S. Application Data
[62] Division of Ser. No. 225,996, Feb. 14, 1972.

[52] U.S. Cl. ............... 425/387 B; 425/DIG. 204; 425/DIG. 208; 425/DIG. 214 425/DIG. 214
[51] Int. Cl. ............................................. B29c 5/06
[58] Field of Search ......... 425/DIG. 203, DIG. 204, 425/DIG. 205, DIG. 206, DIG. 207, DIG. 208, DIG. 212, DIG. 213, DIG. 214, DIG. 215, DIG. 216, 387 B; 53/40, 41, 42, 290, 296; 264/98, 230

[56] References Cited
UNITED STATES PATENTS

| | | | |
|---|---|---|---|
| 3,048,891 | 8/1962 | Maass | 425/326 B |
| 3,304,354 | 2/1967 | Hill et al. | 425/DIG. 214 X |
| 3,438,116 | 4/1969 | Stengle | 53/42 X |
| 3,464,085 | 9/1969 | Burkett et al. | 425/DIG. 207 X |
| 3,546,746 | 12/1970 | Johnson | 425/504 |

FOREIGN PATENTS OR APPLICATIONS

| | | | |
|---|---|---|---|
| 1,450,716 | 12/1965 | France | 425/DIG. 214 |

*Primary Examiner*—Al Lawrence Smith
*Assistant Examiner*—K. J. Ramsey
*Attorney, Agent, or Firm*—Robert R. Cochran; Arthur G. Gilkes; William T. McClain

[57] ABSTRACT

In a blow-molding operation, a method of forming a recessed area in the exterior wall of the parison and maintaining the recessed area in a heated condition while the remainder of the parison is formed and cooled. Also an apparatus (ram means) employed in such a method comprising (a) an arm, (b) a head and (c) a tip. The method and apparatus find application where a gripping-action is desired or required between the fabricated product and another sub-assembly.

12 Claims, 5 Drawing Figures

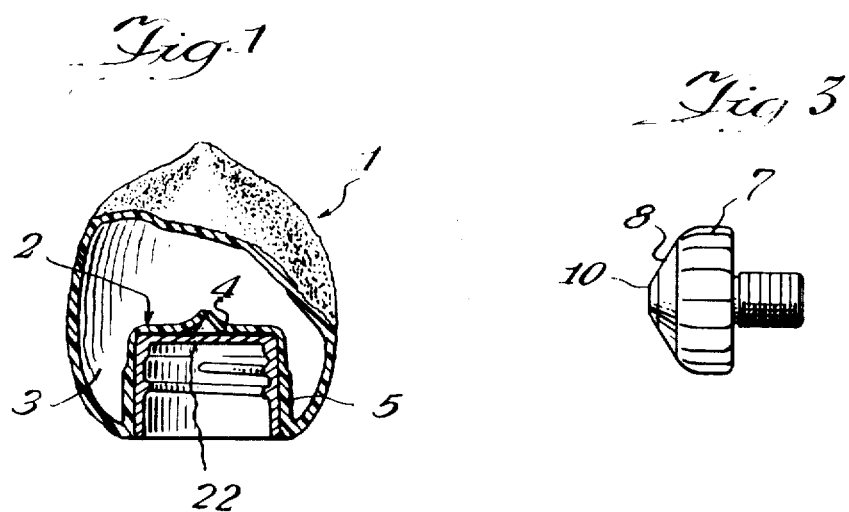
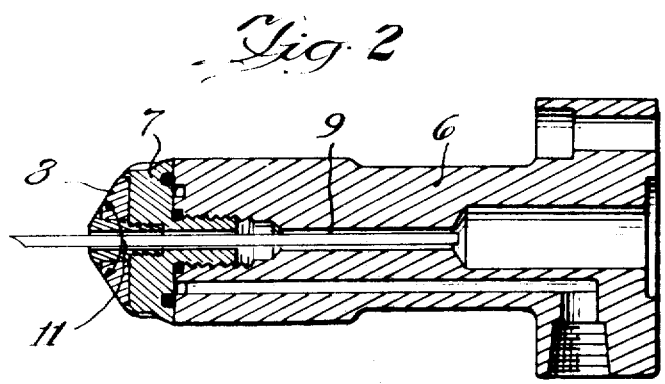
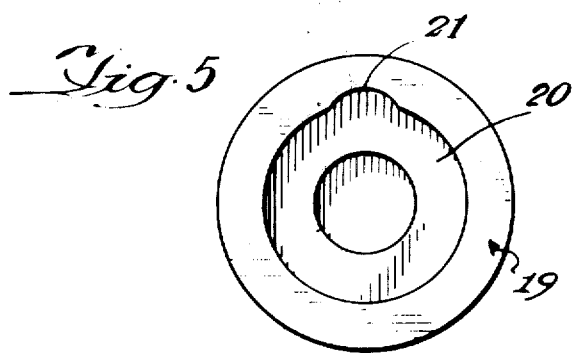

METHOD AND APPARATUS FOR FORMING AND KEEPING MOLTEN THE RECESSED AREA OF A FABRICATED PLASTIC PRODUCT

This is a division of application Ser. No. 225,996 filed Feb. 14, 1972.

BACKGROUND OF THE INVENTION

This invention relates to a method and apparatus, in a blow-molding operation, for making a plastic fabricated product having a recessed portion. More particularly, it relates to a method of forming such a fabricated product and placing it into engagement with a separate sub-assembly to form a relatively tight union between the fabricated product and the sub-assembly.

While the present invention has broad application where it is desired to join, with a relatively tight union, a blow-molded fabricated product with a second, separately fabricated sub-assembly, a preferred application of the present invention is in the blow-molding fabrication of an overcap. An overcap is a blow-molded fabricated product which is either functional or decorative in design, or both, and is desired to fit over a closure for a container, such as the closure of a hair-care product. Heretofore there have been no overcaps which have been designed to grip tightly the container closure. Moreover, there have been no overcaps wherein the portion of the overcap designed to grip the container closure has been completely recessed within the body of the overcap itself. These deficiencies have given rise to a number of problems and disadvantages. Because of the loose-fitting nature of the prior art overcaps, the overcap and the closure become disassembled during shipment necessitating troublesome and expensive re-assembly of the two parts; the sales or promotional advantage arising from the overcap's remaining on the closure is lost because shortly after the packaged product is used—frequently with the first such use—the overcap separates from the closure and is discarded by the consumer. Where the overcap is small enough to swallow, its attractiveness combined with its loose-fitting nature posed obvious hazards to the small child. In addition, the lack of a completely recessed design distracts from the visual effect of the overcap. For example, not only is the outer portion of the overcap design, for example in the shape of a lemon, visible but its visual impact is lessened by a neck protruding down from the base of the lemon designed to loosely engage the closure. All these disadvantages of the prior art are minimized or completely eliminated by the use of the present method and apparatus.

SUMMARY OF THE INVENTION

The present invention has both method and apparatus aspects to it. The method of the present invention comprises, in a blow-molding operation, contacting the exterior wall of a parison with a ram means; forming a recess in the parison wall with the ram means; and maintaining at least a portion fo the recessed area in a heated condition while the remainder of the parison is formed into its desired shape. By "heated condition" (alternately referred to hereinafter as "molten") we maen maintaining the recessed area or at least part of it at a temperature sufficiently high to substantially inhibit the relaxation tendency of the thermoplastic material. In its apparatus aspect, the present invention is directed to a ram means, comprising two elements: (a) an arm, and (b) a tip fabricated from or coated with a material having a thermal conductivity lower than 0.10 cal.-cm/seconds-cm$^2$-°C.

The employment of the method and apparatus aspects of the present invention result in a number of significant advantages. The The invention provides an operationally efficient way of producing a fabricated product with a heated recessed portion. In terms of its overcap application, the invention permits a relatively tight-gripping action between the overcap and the container closure. By "relatively tight" we mean with respect to the torque-values pervailing in the prior art. In prior art overcaps, for example, there is essentially zero torque since heat-shrinking has not been contemplated for blow-molded overcaps. While, for such comparisons, practice of our invention in its broadest scope will produce comparatively tighter unions, we have found that in the practice of our invention using polyethylene we can attain torque values in excess of 20 inch-pounds. A number of benefits flow from this feature—ease of storage and shipping; maintenance of the sales and promotion effect of the decorative portion of the overcap during the entire life of the packaged product; and rendering the design of the overcap "child-proof." Additionally, because of the recessed design, a highly esthetic overcap is provided having no visible embracing means for engagement with the sub-assembly.

Other aspects, objects and advantages of this invention will be apparent to those skilled in the art from the description, drawings and claims.

BRIEF DESCRIPTION OF THE DRAWINGS

FIG. 1 is a front, elevational view, in partial section, showing a fabricated product of this invention in its embodiment as a decorative overcap. The Figure shows the overcap in engagement with a container closure.

FIG. 2 is a side, elevational view, in section, of the ram means of the present invention and shows its component elements.

FIG. 3 is a side, elevational view of the tip of the ram means.

FIG. 5 is a plan veiw of one embodiment of a parison die usefully employed in the present invention.

DETAILED DESCRIPTION OF APPARATUS

Figure 4:
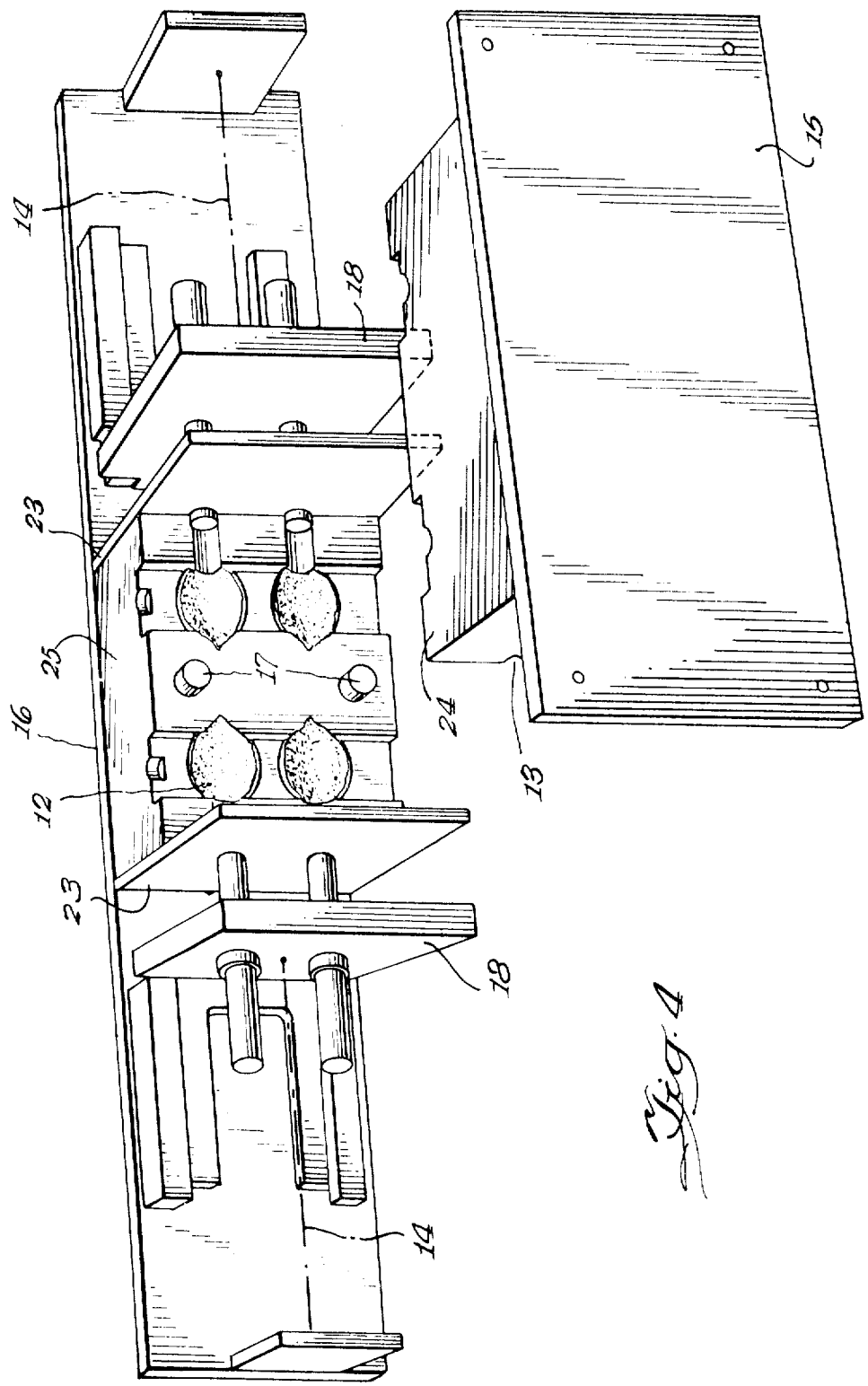
FIG. 4 is a perspective view, partially exploded, of a mold and the ram means and its ancillary equipment.

While the apparatus of the present invention is broadly applicable for the forming and keeping in a heated state recessed areas in the wall of a plastic parison while simultaneously cooling an outer portion to its final form and, therefore, is not restricted to any particular finished fabricated product design, nevertheless it will aid the understanding of the invention to describe the apparatus in terms of its usage in the formation of plastic overcaps (fabricated product) for closures (sub-assembly). Thus, the following description, in that context, is merely illustrative and in no way is to be construed as limiting the scope of the present apparatus invention.

A brief description at this point of the features of an overcap will greatly aid the subsequent description and understanding for the reader fo both the method and apparatus aspects of the present invention. Turning to FIG. 1 a plastic overcap is pictured. It can be seen that the overcap comprises the following major portions: an outer portion 1; a recessed portion 2 which is integral with the outer portion 1; and a void space 3. Elements of the recessed portion 2 comprise a roof 4 and a sidewall 5.

The outer portion 1 of the overcap may be any shape desired. For example, while it may have a decorative appearance, it can be a shape which is essentially functional. Or the outer portion 1 of the overcap may be essentially decorative. For example, this outer portion 1 may be in a shape resembling the design of a trademark of the packager. Or the design of the outer portion 1 may be associated in some way with the type of product which is being packaged in the container. For example, for lemon containing-hair-care products the outer portion 1 of the overcap may be in the shape of a lemon as shown in FIG. 1.

Turning now to FIG. 2, 3 and 4 we can illustrate the apparatus of the present invention and the ancillary apparatus with which it cooperates.

In FIG. 2 a preferred embodiment of the ram means is shown with its three elements shown in section: the ram arm 6; the cooling head 7; and the ram tip 8. Additionally, in FIG. 2 is shown an inflation means 9.

In FIG. 3 are shown the ram tip 8 and cooling head 7 in greater detail. While, in its broadest scope, the apparatus of the present invention does not comprise the cooling head 7 element, the preferred design of the apparatus of the present invention does include such a cooling head. While the considerations dictating the presence or absence of a cooling head 7 element will be made clear in other portions of the specification, briefly, in some cases only the roof 4 of the recess portion 2 need be maintained in a heated state. Where such is the case, the remaining portions of the recessed portion 2 are cooled employing the cooling head 7 as a convenient heat transfer device. The cooling head 7 is designed so that it has substantially the same shape and dimensions as the sidewall poriton of a closure (for example, the circular wall portion, in the case of a cylindrical closure). Thus, when the ram means is brought into engagement with parison the recessed portion 2 of the overcap, which the ram tip and head form in the exterior wall of the parison, takes on the approximate shape and size of the closure over which it will be ultimately placed.

The cross-sectional shape of cooling head 7 is, of course, determined by the configuration of the separately fabricated sub-assembly (for example, the closure itself) into which the fabricated product will be brought into embracing engagement after the blow-molding operation. The embodiment shown in FIG. 2 has a circular cross-section. Such a circular cross-section would be preferred when the separate sub-assembly itself was circular in cross-section, for example, a circular closure for a container or a cylindrical axle. While the exterior surface of the cooling head 7 may have any surface configuration, a preferred embodiment is shown in FIG. 3. Therein, the parallel lines running axially of the cooling head 7 represent grooves or serations or the like which form ribs in the sidewall 5 of the recessed portion of the fabricated product which enhance the tight-fitting union between the fabricated product and the sub-assembly.

The cooling head 7 can be made of any material. Metals are preferred, however, and the most preferred material of construction for the cooling head 7 is a metal having a relatively high thermal conductivity—i.e. one which is above about 0.30 calorie-centimeters/seconds-square centimeters-°C. For example, among the most preferred materials of construction would be copper, aluminum, and beryllium-copper alloy.

The cooling head 7 should be provided with some cooling means whereby the external area of the cooling head 7 has a surface temperature such that adequate heat is removed through the cooling head 7 thus maintaining the temperature of the parison wall within which it is in contact below the temperature of the parison wall in contact with the tip 8. The details by which this may be accomplished are within the skill of the art. Maintaining the outer temperature of the cooling head 7 at such a reduced temperature avoids a number of problems which would, in some cases, interfere with the successful molding of the recessed portion. One such problem would be that the quantity of heat in the entire recessed portion 2 might tend to create a temperature build-up which would eventually effect collapse of the roof 4 of the recessed portion. A related effect is that the sidewall 5 of the recessed portion 2 would be distorted with consequent loss of a tight fit over the sub-assembly within which it will be later placed into engagement. Where the particular thermoplastic material of the parison is not seriously affected by such problems, then, of course, there is no need to include—except for decreased cycle-time—in the apparatus of the present invention a cooling head 7. In such cases the apparatus of the presnt invention comprises only two essential elements—the arm 6 and the ram tip 8.

The dimensions of the cooling head 7—both its maximum cross-section and its depth dimensions—are of course, determined by the configuration and dimensions of the sub-assembly. Selection of different parison materials with varying shrinkage tendencies will, of course, also be a determinant—particularly of the cross-sectional dimension. However, it is well within the skill of the art to select the proper dimensions for the head based on these considerations. Generally, the maximum cross-sectional dimension (the diameter of the circle representing the circumference of the head 7 shown on the embodiment of FIG. 2 and 3) is about 30 to 40 thousandths of an inch greater than the corresponding dimension on the sub-assembly. Preferably, this dimension should be approximately equal to or smaller than the corresponding part of the sub-assembly and it is most preferred that this dimension be the smallest effective size. By "smallest effective size" we mean that the cross-section of the cooling head (and therefore that of the recessed area) should be as small as possible consistent with such a sizing of the recessed area permitting the subsequent joining of the recessed area and sub-assembly without undue distortion or damage to the fabricated product. For example, the cross-section dimension of the ram (and therefore the recessed area) is not so much smaller than the corresponding dimension of the sub-assembly that the recessed area of the fabricated product could not be assembled with the sub-assembly without damaging or collapsing the sidewall of the recessed area. It can be seen from the foregoing that determination of the smallest effective size is well within the skill of the art. Illustrative of a preferred dimension which is smaller than the corresponding part of the sub-assembly is a dimension 30–40 thousandths of an inch smaller in this dimension (diameter in FIG. 2 and 3) than the corresponding dimensions of the sub-assembly. Since, the above illustrations are based on a circular recess to engage a circular sub-assembly, it will be appreciated that in terms of clearance (or difference in radii in the illustration), a clearance of 15 to 20 thousandths of an inch corresponds to the 30–40 thousandths range given above. For ease of reference, hereinafter, the entire range suitable for the cross-sectional dimension of the cooling head 7 as disclosed in this entire paragraph, shall be described as being "the approximate size of the sub-assembly" and this will encompass dimensions greater than, equal to, and smaller than the corresponding dimensions of the sub-assembly.

For example, respecting its depth dimension, the cooling head 7 may vary being, on the one hand, equal to that depth of the corresponding part of the sub-assembly necessary for adequate gripping action. Or, in some cases, the depth of the cooling head 7 can be less than its ultimate depth as it would be in combination with the sub-assembly. This lesser depth is made possible by the elasticity of the material of which the fabricated product is molded. Thus the ultimate depth could be attained by a more shallowly-sized cooling head being used to form the recess followed by a sub-assembly being forced against the heated recessed portion thereby stretching the plastic to its ultimate depth.

The function of the ram means is, of course, to form the recessed portion 2 of the overcap and, additionally, to maintain the recessed portion 2 or at least a part of it in a heated state up to the time the finished overcap is placed into embracing engagement with the closure. Thus the ram means, more particularly its tip 8 must be so designed as to maintain a temperature sufficient to keep the recessed portion 2 of the overcap in a heated state. The manner in which such a temperature is maintained will be discussed in greater detail hereinafter. One such way is to select a suitable material of construction for the tip 8. The ram tip 8 can be made of a variety of materials. Selection of any specific material of construction for the tip will, of course, be dictated by the parison material being used to mold the finished part. Thus, such factors as the temperature of the parison during molding, the affinity of the parison material for that of the ram tip 8 will come in to play. Apart from such considerations, however, the material of the ram tip 8 can be any material which has a low thermal conductivity, i.e.—lower than 0.10 cal.-cm/seconds-cm$^2$-°C. Particularly preferred materials are those which have thermal conductivities lower than 0.001 cal.-cm/seconds-cm$^2$-°C such as for example such fluropolymers as polytetrafluoroethylene (Teflon) and polychlorotrifluoroethylene and fluorinated ethylenepropylene resins; or the rigid silicon resins such as those prepared by co-hydrolyzing organo-chlorosilane. These immediately enumerated materials are particularly useful where there is a tendency of the hot plastic of the parison to stick to the ram tip 8. The foregoing fluro-polymers are particularly preferred where the parison material is a polyethylene.

The entire mass of the ram tip 8 may be made of any of the tip materials or a metal, for example, may be employed as the core of the tip and the core coated with any of the tip materials. A holding means 10 is also shown in FIG. 3. This holding means is not an essential part of the design of the ram tip; however, it is a convenient way to construct the tip. For example, such holding means can consist of an open Allen screw holding the entire assembly of tip and the head together. Where such a holding means is necessary, it is advantageously coated with the aforementioned materials. Such a holding means must, as with an open Allen screw, provide for a hollow core section permitting the movement within it of an inflation means 9.

The ram tip 8 can, advantageously, be of any shape, for example, cylindrical. However, we have found that the preferred configuration is cone-shaped (with the base of the cone, as can be seen from FIG. 2, being joined to the arm 6). The included angle 11 of the cone (shown in FIG. 2) can vary from about 90° to about 150° with the preferred angle being between about 115° to about 125°. Such a cone-shaped design renders more flexible the ranges of thicknesses available for use in that portion of the parison wall to be contacted by the ram means. Thus, using the preferred cone-shape, since the tip 8 tapers away from the parison wall less material of the parison need be displaced in the process of forming the recess. Additionally, the end of the tip 8 should be so designed as to avoid a sharp point which would tend to rupture the parison wall. For example, the cone could be a right truncated cone or have a rounded or otherwise blunted end to avoid such a sharp point. Any other method of avoiding such a sharp point within the skill of the art would be satisfactory for our apparatus. It will of course be appreciated that the final shape fo the recessed portion 2 of the fabricated product is fully reconcilable with whatever geometry is most suitable for the ram tip 8. This is so because the ram tip 8 maintains the recessed portion in a heated condition up to the time of the post-molding assembly step with the sub-assembly. Thus, where the ram tip 8 is of the preferred conical design, for example, if the sub-assembly is cylindrical, the ultimate shape of the recessed portion 2 will be cylindrical with, additionally, a relatively flat roof conforming to the end of the cylindrical sub-assembly.

Another way to maintain a sufficient temperature in the ram tip 8 is to deliberately heat the tip 8 by providing it with heating coils, for example. However, the preferred means —both from the point of view of economy of design and operation—is to select the aforementioned tip materials of low thermal conductivity, thus permitting the use of the heat content of the parison as the sole source of heat for the maintenance of the appropriate tip temperature.

In the preferred application for our apparatus—a blow-molding operation—we, of course, employ an inflation means. While any manner of introducing an inflation means, such as by blowing needle, into the interior void of a parison is equally suitable with out method, reference to FIG. 2 shows a preferred embodiment for our inflation means 9. In FIG. 2, inflation means 9 is positioned within a channel which passes through the entire ram means. The inflation means 9 is connected with the elements of the ram means so that it can reciprocate within this channel. Its reciprocal movement is of course coordinated with the other blow-molding sequences which normally take place. While details of the inflation step will be given hereinafter in the detailed description of our method, after the mold closes on the parison, the entire ram means moves forward into the wall of the parison and at some point therafter the inflation means moves forward (toward the tip 8 of the ram means), its forward end emerges from the ram tip 8 and penetrates into the hollow interior of the parison and inflation begins. Following inflation the inflation means 9 is retracted.

In general, any of the various types of molds which have been heretofore used in blow-molding are useful in the practice of the present invention. Thus for example the simplest form of a blow mold, consisting of two female cavities which close around the parison can be used with advantage in the present invention. Such molds with their usual conventional elements consisting of pins, bushings, pinch-off plates, and adequate cooling channels for heat transfer can be employed in the practice of the present invention. It will be useful at this point to consult FIG. 4 for an overall picture of the preferred apparatus of the present invention and for a particular detail of the mold design. FIG. 4 shows an overcap 12 during part of the blow-molding sequence.

A mold is shown in that figure which is conventional in its design other than for the provision of an entry port 13 through which ram means 14 enters the closed mold and comes into engagement with the parison. In FIG. 4, while the operation is being veiwed during the ongoing formation of the overcap 12, for clarity, the front plate 15 of the mold, with the front mold-half 24, is shown exploded-out and in nonengagement with the back mold-half 25 which is attached to the back plate 16 of the mold. Of course, at this stage in the actual operation of the method, front mold-half 24 is in molding-stage engagement with the back mold-half 25 through the conventional arrangement of pins 17 and bushings (not shown). Also shown in FIG. 4 are the side plates 23 of the mold. The side plates 23 are rigidly connected to the back plate 16 of the mold. These side plates, of course, are provided with a port for the passage of the ram means through them and into the entry port 13 is provided in both the front mold-half 24 and the back mold-half 25 and that in fact, each entry port is a semicircle in cross-section providing, therefore, in a closed-mold position the full cylindrically shaped entry port. Mold closure is effected by front mold-half 24 moving into engagement with back mold-half 25 by moving inside the side plates 23. Ram means support plate 18 is attached to the carriage which provides for the reciprocating action of the ram means.

Thus, conventional molds may be used if they are additionally provided with an entry port so positioned in the mold to accommodate the ram means and to guide the ram means into contact with that portion of the wall of the parison into which the recess will be made.

FIG. 4 also shows the ram means support plate 18. This is merely an illustration to show one means of connecting the ram means assembly with the source of power actuating it. Thus, in the embodiment of FIG. 4, the ram means support plate 18 is rigidly connected to the arm of the ram means 14. This arm is in turn connected to the power source, for example hydraulic cylinders (not shown) whose action thrusts the ram tip and head through the entry port 13 and into contact with the parison wall by movement of the entire ram means assembly on a carriage (not shown).

The design of the entry port is dictated by conventional parameters within the skill of a machinist. For example, the material of its construction can be any heretofore used in molding equipment and its dimensions are selected to provide the clearances usual in the art, for example, we observe clearances of about .0025–.0030 inches between the ram arm and entry port.

DETAILED DESCRIPTION OF METHOD

The material selected for the parison may be any thermoplastic material useful in blow-molding. By way of illustration, such thermoplastics as polyethylenes, polypropylenes, polycarbonates, methacrylate polymers, acetal resins, and polystyrenes as well as rigid formulations of polyvinylchloride are useful materials in the practice of our method. A preferred class of such blow-moldable thermoplastic materials are those having a tensile strength greater than about 1500 psi. Such thermoplastics are able to withstand the recess-formation step without the need for carefully controlling such details of the operation as, for example, the speed of the ram means at the time it contacts the exterior wall of the parison. A particularly preferred class of thermoplastics, however, are the polyethylene resins, both branched and linear. Selection of the material is largely determined by the field service requirements of the packager. However, usually many grades and types of thermoplastics are available as candidates for his selection. While the principal object of the present invention—i.e. the formation of relatively tight bonding between the fabricated product and the sub-assembly—is possible by following the munipulative steps of the present invention using any blow-moldable resin, optimum results may be obtained by selecting, within the range of available candidates, a grade of thermoplastic material which has a relatively high shrinkage. Such a relatively high shrinkage permits the still molten recessed portion 2 to shrink tightly over the sub-assembly as it cools thereby forming a high-torque bond between the fabricated product and the sub-assembly. We have found that an especially preferred high-shrinkage thermoplastic material is polyethylene having the following properties:

| PROPERTY | VALUE |
| --- | --- |
| Density (g/cm³) | 0.922 |
| Melt Index (g/10 min) | 1.0 |
| Secant Modulus (psi)(Stiffness) | 25,000 |
| Tensile Strength (psi) | 2,500 |
| Yield Strength (psi) | 1,500 |
| Ultimate Elongation (%) | 600 |
| Durometer Hardness | 47 |

Of course, once any paticular thermoplastic material has been selected for the parison, shrinkage can be controlled in a variety of ways known to the art, such as short-cycle time, rapid cooling etc. These control methods are likewise useful in our method.

The type of molding equipment used in forming the parison is not important to the practice of the present invention; any of the various methods for formation of the parison used heretofore are also acceptable in the practice of the present method. Illustrative of such methods of parison-formation are: extrusion of the parison and injection molding of the parison. The foregoing methods, of course, result in a continuous operation beginning with the formation of the parison through to the production of the finished molded part. However, the parison formation-molding sequence may be discontinuous. For example, it is known in the art to preform the parison in a separate operation and then store, for example at room temperature, the pre-formed parisons for later introductions into the molding operation. Such an alternative mode of making the fabricated products of the present invention is within our contemplation and, of course, in such an operation the stored, unheatd pre-form is, prior to the molding step, heated to the temperature appropriate for the subsequent molding operations.

In the practice of our method the parison is provided with a thickened section of wall in the area of the parison wall into which the recess is to be formed. The area over which this thickened section extends is largely determined by the method of forming the thickened section. One method for forming such a thickened section is, for example, to modify a die having a circular orifice designed to extrude a substantially cylindrical parison by forming at the circumference of the circle an arc intercepting and interrupting the circumference and forming a segment of a second and smaller circle whose perimeter is, radially, outside the perimeter of the larger interrupted circle. Such a die orifice configuration is shown in FIG. 5 wherein the solid die body is shown as 19, the interrupted circular orifice forming the major portion of the parison as 20, and the small arc providing for the thickened section of parison wall as 21. Where the thickened section is formed in such a manner, by a fixed parison orifice, it extends axially of the parison, along its full length. An alternate method of forming the thickened section of wall is to "program" a parison die. In such programming a substantially circular die orifice begins the parison formation sequence extruding a substantially cylindrical parison with uniform wall thickness. Then at the point on the wall of the parison to be provided with the thickened section, the opening of the orifice is widened, thereby producing a band of thickened section running circumferentially of the parison wall. As can be seen a number of obvious variations can be utilized to form the thickened section of the wall; all such techniques fall within the contemplation of our method. The dimension of the thickened section of wall depend, of course, upon the size of the recess to be formed on the wall and, once the dimensions of the recess are known, it is well within the skill of the art to provide the appropriately-sized thickened section.

When the thus formed molten parison drops from the die orifice the molten parison is next enclosed in the conventional manner by the mold halves. Then, according to our method, the exterior wall of the parison is contacted by the ram means. The temperature of the ram tip is maintained at any temperature sufficient to keep the recessed portion of the fabricated part in a molten or plastic condition such that rapid relaxation or shrinking is inhibited. We have generally found this to be within about plus or minus 150°F. of the parison die temperature at the point close to the discharge of the parison die orifice (hereinafter "parison drop temperature"); preferably within plus or minus 30°F. of that temperature. The purpose of maintaining this elevated temperature is to insure that at least a portion of the recessd portion 2 of the fabricated product is kept molten until after the blow-molding step and up to the time that the fabricated product is placed into engagement with the sub-assembly.

Advantageously, the entire recessed area—both roof and sidewall—are maintained in the molten condition. However, because some of the thermoplastic materials useful in our methods have a certain sensitivity to the problems of roof and sidewall distortion, it is preferred that only the roof portion of the recess and sufficient percentage of the sidewall extending from the roof are maintained in the heated condition. The remainder of the sidewall of the recessed area in such an embodiment is thus cooled. Most preferably, only the roof portion of the recess is maintained in a heated or molten condition with the entire sidewall or substantially the entire sidewall being cooled. In such an embodiment a part of the thermoplastic material which is maintained in a molten condition is displaced from the vicinity of the roof portion of the recess to the interior of the plastic mass and into the vicinity of the area adjacent the sidewall. This re-distribution of thermoplastic material enhances the gripping action with the sub-assembly since relaxation is taking place both in the vicinity of the roof and the vicinity of the sidewalls.

The temperature ranges given above are not critical since any temperature at which the thermoplastic material has not fully relaxed serves the primary object of the invention to obtain shrinkage of the fabricated product about the sub-assembly. Illustrative of the foregoing are the temperatures we have employed where the parison material is low-density polyethylene. Therein the parison temperature as it drops from the parison die is at about 280°F–290°F. This tip is maintained at a temperature within 30° (i.e., 250°F.–320°F.) of that range. A lower limit for this tip temperature, using such polyethylene, is approximately 150°F., at which point the relaxation or shrinkage tendency is pronounced. The movement of the ram means into engagement with the molten parison proceeds until the recessed area assumes its desired dimensions at which point the movement of the ram means 14 into the molten parison stops. Of course, the depth of penetration of the ram means into the thermoplastic material depends upon a number of factors all of which have been discussed hereinbefore during the description of the dimension for the cooling head 7. This position is then maintained until the end of the blow-molding sequence of operations.

With the recessed portion being thus maintained in a molten state, the interior wall of the parison, not supported by the ram means is inflated against the cooled interior walls of the mold. Inflation may be carried out by any of the conventional means known to the art. For example, air may be used, or a mixture of water vapor and air, or carbon dioxide or a mixture of air and carbon dioxide may be usefully employed. With the outer wall of the parison thus held against the interior walls of the mold, the formation of the outer portion 1 of the fabricated product begins.

When the outer portion 1 of the fabricated product has taken its final shape the inflation means 9 and the ram means 14 are removed from their respective communications with the formed overcap. At this point the mold opens and the finished fabricated product, with the recessed portion 2 still molten, is placed into embracing engagement with the sub-assembly over which is shrinks, forming a high-torque combination with the sub-assembly.

As an Example of our method, Union Carbide's Polyethylene 3900 was selected as the parison material and was extruded through a parison die orifice, similar in design to the one depicted in FIG. 5. The area of the parison into which the recess was formed, was provided with a thickened section of wall by extrusion through parison die orifice similar to that depicted in FIG. 5. The approximate temperature of the parison stock as it exited the parison die orifice was about 320°F. The approximate temperature of the ram tip was 320°F. The parison was extruded for about 2–3 seconds at which point the two open-mold halves closed about the parison. Approximately 4 seconds elapsed after mold-closure, at the end of which period the ram means moved forward, entered the entry port of the mold and came into contact with the thickened section of the parison wall. Approximately simultaneously with the contacting of the wall by the ram means, a blowing needle, movably mountable in the ram means, actuated and the discharge end of the blowing needle penetrated the roof of the recessed area and entered into the hollow interior of the parison and began to inflate that portion of the parison not in contact with the ram means against the cooled interior walls of the mold, forming the outer portion of an overcap in the shape of a lemon about 2 inches high and about 2 inches at its maximum diameter. The inflation medium was air and the length of time for inflation was approximately 16 seconds. Inflation pressure was about 40 to about 60psig. Following this inflation, the needle was retracted while the tip and head of the ram means continued in contact with the recessed portion of the parison wall. The ram means was withdrawn 2 to 3 seconds later, the mold opened and the overcap which was formed was removed from the mold. With the recessed portion still in a heated condition, the overcap was placed by hand into embracing engagement with a closure for a container. The speed of the blow-molding operation was 180 cycles per hour (i.e. between consecutive mold-closings). The thus joined overcap and closure were held at room temperature approximately 1 hour after which the torque-strength of the bond between the two was tested with a torque wrench. A conventional torque wrench was used for the test except that a holding means, adapted to fit snugly within the closure, was provided on the shaft of the torque wrench. The torque wrench was hand-operated and indicated that a torque greater than 20 inch-pound was attained before the torque wrench was "stripped," thus breaking the bond.

Having thus described our invention what we claim is:

1. A ram apparatus with a tip suitable for maintaining the temperature of a portion of a molten plastic material with which said tip is in contact while capable of cooling another part of said plastic material, wherein said ram apparatus comprises:
    a. an arm containing a channel so constructed as to permit the passage of inflation means;
    b. a tip connected to an end of said arm wherein said tip comprises:
        1. a hollow channel aligned with the channel in the arm and so constructed to permit said inflation means to pass through both channels in a freely reciprocating manner with respect to said channel;
        2. a surface area capable of being cooled adjacent said arm; and
        3. a second surface area on the forward end of said ram, distinct from said area capable of being cooled but adjacent thereto, constructed from or coated with a material having a thermal conductivity lower than 0.10 cal.-cm./sec.-cm.$^2$-°C.; and
    c. inflation means capable of reciprocating within said channel.

2. The apparatus of claim 1 where the tip material for said second surface area has a thermal conductivity lower than about $10^{-3}$ cm.-cm./sec.-cm.$^2$-°C.

3. The apparatus of claim 1 wherein the tip material for said second surface is a fluoro-polymer.

4. An apparatus useful in blow-molding a fabricated product from a parison of molten plastic material, said fabricated product having an outer portion with an integral recessed portion, wherein some portion of said recessed portion is maintained in a molten condition while the remainder of the fabricated products is formed and cooled, said apparatus comprising:
    a. a mold in which said parison is formed in the shape of the fabricated product, and
    b. means for forming a recessed portion in the fabricated product and for differentially cooling said molded fabricated product so that a portion of said recessed area is maintained in a molten state while the remaining portions of the product are cooled to a final form, said means comprising a ram including an arm and a tip at one end of said arm constructed from or coated with any material having a thermal conductivity lower than 0.10 cal-cm./sec.-cm.$^2$-°C.

5. The apparatus of claim 4 wherein the thermal conductivity of the tip material is lower than about $10^{-3}$ cal.-cm./sec.-cm.$^2$-°C.

6. The apparatus of claim 4 wherein the tip material is a fluoro-polymer.

7. The apparatus of claim 4 wherein the tip material is polytetrafluoroethylene.

8. The apparatus of claim 1 where said surface area capable of being cooled is provided with cooling channels.

9. The apparatus of claim 1 where said second surface area is constructed of a material having a thermal conductivity above 0.30 cal. cm./sec.-cm.$^2$-°C.

10. The apparatus of claim 4 where the tip is cone-shaped and has a blunt, front end.

11. The apparatus of claim 10 where the included angle of the tip is between about 90° to about 150°.

12. The apparatus of claim 10 where the included angle of the tip is between about 115° to about 125°.

* * * * *